United States Patent [19]
Morrison

[11] 3,885,769
[45] May 27, 1975

[54] VARIABLE FLOW-CONTROL VALVE

[75] Inventor: Wallace T. Morrison, Whittier, Calif.

[73] Assignee: Stoody Company, Santa Fe Springs, Calif.

[22] Filed: June 20, 1973

[21] Appl. No.: 371,802

[52] U.S. Cl. .................................. 251/5; 222/504
[51] Int. Cl. ............................................. F16k 7/07
[58] Field of Search ........... 251/5, 30; 222/545, 504

[56] References Cited
UNITED STATES PATENTS

| | | | |
|---|---|---|---|
| 1,930,361 | 10/1933 | Kilmer | 251/5 X |
| 2,573,712 | 11/1971 | Kallam | 251/5 |
| 2,746,709 | 5/1956 | Minor | 251/5 X |
| 3,556,461 | 1/1971 | Little | 251/5 |
| 3,757,808 | 9/1973 | Peterson et al. | 137/487.5 X |

Primary Examiner—Martin P. Schwadron
Assistant Examiner—Richard Gerard
Attorney, Agent, or Firm—Nilsson, Robbins, Bissell, Dalgarn & Berliner

[57] ABSTRACT

A flow meter is disclosed for controlling the flow of a substance in accordance with a control signal. A somewhat-tubular member of resiliently-deformable material includes a plurality of internal, radial extensions from the tubular wall which are inflated to varying degrees to vary the internal passage and control the rate of flow through the member. The wall thickness of the tubular member is somewhat uniform (including the extensions) and a housing is provided to enclose the external surface of the member. Means are then provided for varying the pressure applied to the exterior of the member so that the extensions can be deformed or inflated to variously close the passage through the member.

4 Claims, 4 Drawing Figures

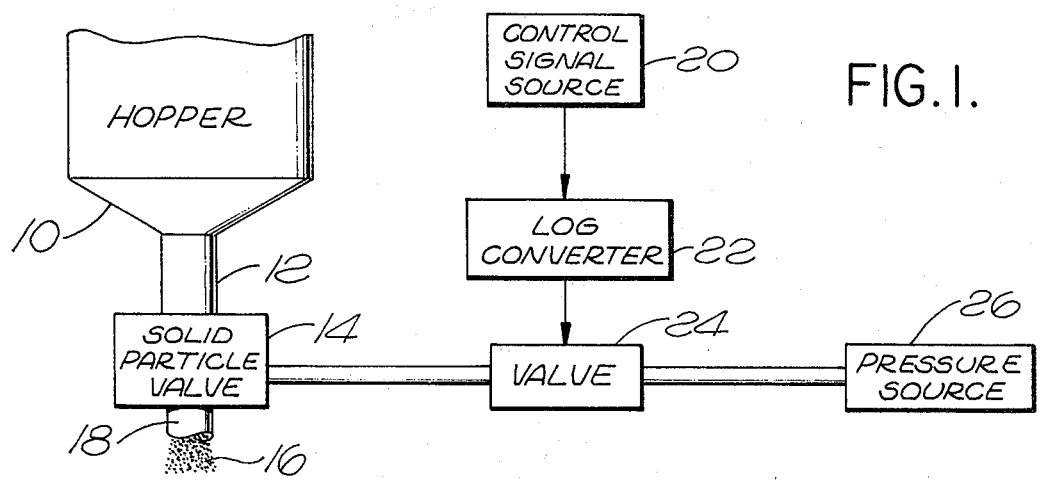
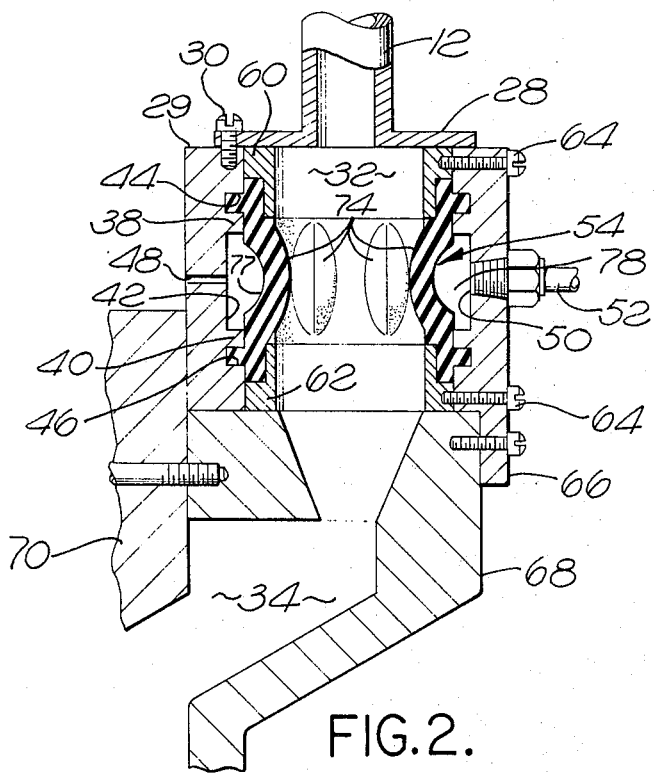
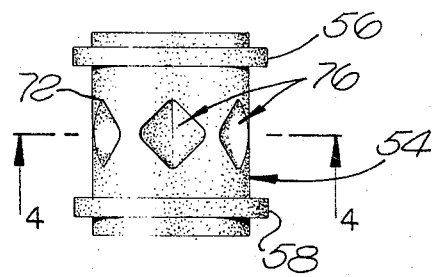
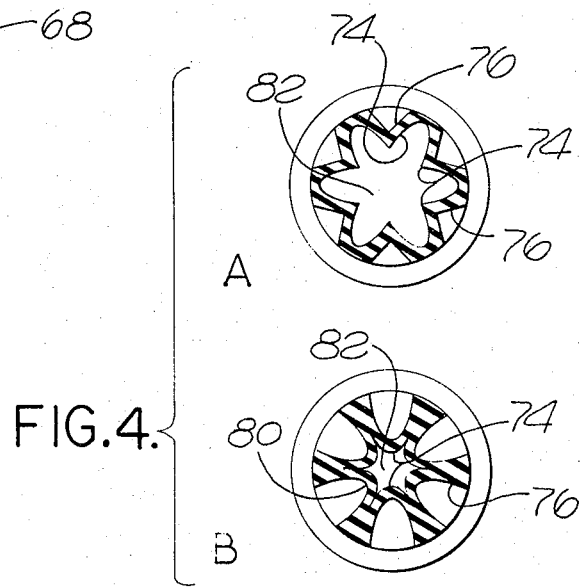

VARIABLE FLOW-CONTROL VALVE

BACKGROUND AND SUMMARY OF THE INVENTION

Frequently, the need arises to control the rate at which a substance flows through a passage. In the past, a wide variety of valve structures have been proposed, some of which are readily usable in applications requiring response to a control signal. For example, so-called "pinch valves" have been proposed using a rubber tube that is pinched to various closures for controlling flow rate through the tube. Although such valves have been employed widely, they tend to lack fine control in operating states that approach total closure.

A rather special flow-control problem has been found to exist in controlling flows of a solid material, e.g., pulverized substance. Generally, the need for valves to control such substances tends to be increasing in view of increasing tendencies toward automation and automatic control of various processing operations. However, prior valves proposed for such applications generally have been found unsatisfactory. Specifically, difficulties have been experienced with clogging, abrasive wear, jamming of moving parts and fine control of small streams. In addition to these considerations, a need also exists for a valve of the type under consideration which may be economically constructed and operated.

Generally, the present invention is directed to a variable-flow valve in which the control passage is defined by a plurality of intrusive projections of resiliently-deformable material that may be variously inflated to attain varying degrees of abutting contact and closure of the passage. More specifically, the present invention incorporates such a structure in a housing for operation with means for controlling the fluid pressure active on the resiliently-deformable projections.

BRIEF DESCRIPTION OF THE DRAWINGS

In the drawings, which constitute a part of this specification, exemplary embodiments exhibiting various objectives and features hereof are set forth. Specifically:

FIG. 1 is a schematic diagram of a system constructed in accordance with the present invention;

FIG. 2 is a sectional view taken centrally through a portion of the structure illustrated in FIG. 1;

FIG. 3 is a side elevation of a component element of the structure illustrated in FIG. 2; and FIG. 4 shows sectional views taken along line 4—4 of FIG. 3 under different operating conditions.

DESCRIPTION OF THE ILLUSTRATIVE EMBODIMENT

As required, a detailed illustrative embodiment of the invention is disclosed herein. The embodiment merely exemplifies the invention which may be constructed in various other forms, some of which may be quite different from the disclosed illustrative embodiment. However, specific structural and functional details disclosed herein are merely representative and in that regard they provide a basis for the claims herein which define the scope of the invention.

The disclosed embodiment of the present invention is directed to a flow-control system for particle or granular solid material. Specifically, a hopper 10 (FIG. 1) includes a gravity-flow channel 12 which terminates at a solid-particle valve 14 which is constructed in accordance with the present invention. The valve 14 controls the flow of particle material from the hopper 10, dispensing a stream 16 from a duct 18 in compliance with an electrical control signal provided by a signal source 20.

The control signal source 20 may comprise a wide variety of different structures including simply a manually-operated unit for providing various levels of signal amplitude to command desired rates of flow. The electrical signal from the source 20 is applied through a log converter 22 to a fluid or pneumatic servo control valve as well known and specifically identified as, servo valve 24. Various forms of the log converter 22 and the servo valve 24 are well known and readily available in commerce. Essentially, the log converter 22 provides an output signal that is exponentially related to the signal from the source 20 to compensate for a characteristic of the particle valve 14 to thereby linearize the response thereof. The servo valve 24 is connected between the particle valve 14 and a source 26 of pressurized fluid, e.g., air.

In the operation of the system of FIG. 1, the control signal source 20 functions through the log converter 22 to provide various rates of fluid flow from the pressure source 26 to the solid particle valve 14. Generally, the solid particle valve 14 is ported (as disclosed in detail below) with the result that a control pressure is developed in the valve 14 which is responsive to the flow of fluid through the valve 24. The pressure developed in the particle valve 14 in turn controls the state of the valve 14 and thereby regulates the magnitude of the stream 16 of particle material.

Considering the solid-particle valve 14 in somewhat greater detail, reference will now be made to FIG. 2. Generally, the channel 12 (from the hopper 10) terminates in a flange 28 which is affixed to an external housing 29 of the valve by studs 30. A central passage 32, aligned below the channel 12, extends through the valve, terminating at a chamber 34 which is coupled to the outlet of the valve, i.e., duct 18 (FIG. 1).

The external housing 29 of the valve consists primarily of an annular member defining a pair of internal ridges 38 and 40, defining a central annular recess 42 therebetween and spaced-apart annular grooves 44 and 46 on each side thereof. A bleed orifice 48 extends radially from the recess 42 and diametrically opposed thereto is an inlet 50 which threadably receives a pressure line 52. The housing 29 may be variously formed of rigid materials, e.g., metal, using casting and machining techniques.

The external housing 29 telescopically receives a somewhat-cylindrical valve member 54 which is separately illustrated in FIGS. 3 and 4. Contiguous to the opposed ends of the valve member 54, a pair of integral concentric flanges 56 and 58 (FIG. 3) extend to be received within annular grooves 44 and 46, respectively, (FIG. 2). A pair of annular inserts 60 and 62 are concentrically received at the upper and lower ends of the member 36, respectively, and are affixed thereto as by studs 64 to hold the somewhat-cylindrical or tubular member 54 in position. The enclosure of the member 54 is completed by a partial collar 66 extending over and affixed to a support base 68 which is in turn affixed to a frame 70.

The central section 72 (FIG. 3) of the valve member 54 defines six equally-spaced intrusions 74 (FIG. 2).

The wall thickness of the intrusions 74 is substantially the same as the wall thickness of the cylindrical portions of the section 72 with the result that an indentation 76 (FIG. 3) results behind each of the intrusions 74 (FIG. 4a).

It appears somewhat critical to the operation of the structure that the intrusions 74 possess a somewhat sectorial shape so that when pressure is applied to the indentations 76, adjacent intrusions 74 become abuttingly engaged (FIG. 4b) in a closed relationship. Consequently, as indicated in FIG. 2, the individual intrusions 74 resemble segments of an edge-tapered disk (line annulus) backed by the open indentations 76 (FIG. 3).

Generally, it has been determined that improved operation is attendant the use of substantially entirely natural rubber in the valve member 54. It has also been determined that the use of six intrusions 74 affords good operating characteristics; however, in alternative arrangements, intrusions numbering three or more also appear to be effectively operative. Of course, the valve member 54 may be variously formed; however, rubber-molding techniques have been successfully employed in that regard.

In the operation of the valve 14 to control the flow of solid-particle material, certain characteristics are perhaps noteworthy. Specifically, as indicated above, the response of the valve tends to be exponentially related to the pressure applied in the space 78 (FIG. 2) defined between the recess 42 and the valve member 54. As a related consideration, the valve has been determined to have considerably better control characteristics as it approaches a closed state (FIG. 4b) than when approaching a fully open state (FIG. 4a). Consequently, in certain applications, it may be desirable to use a plurality of the valves 14 in parallel or shunt relationship so that more stable operation tends to occur with the valves somewhat closed.

As a somewhat unexpected feature of the valve 14, substantial experience suggests that the member 54 tends to resist abrasion even though the particle material in the stream is abrasive. This fact may suggest that individual particles tend either to fall freely through the passage 32 (FIG. 2) or move relatively little when adjacent the valve member 54.

Considering the detailed operation of the illustrative control valve, assume initially that the system is in a state with no stream 16 flowing from the hopper 10. To maintain such a state, the control signal source 20 provides a relatively-high amplitude electrical signal which is supplied through the converter 22 to the servo valve 24 with the result that the servo valve 24 is substantially open permitting substantial flow from the pressure source 26 through the line 52 (FIG. 2) into the space 78. Of course, fluid, e.g., air, bleeds from the space through the orifice or port 48; however, the open valve 24 (FIG. 1) maintains an elevated pressure in the space 78. As a consequence, the intrusions 74 are inflated beyond the state indicated in FIG. 4b with the result that the engaging surfaces 80 totally close the passage 32.

From a state involving no flow of the solid particles (stream 16 cut off), assume next that the control signal source 20 provides a signal of reduced amplitude which upon application through the converter 22 partially closes the servo valve 24. As a consequence, the flow through the bleed orifice 48 (FIG. 2) permits a reduction in pressure within the space 78 with the result that the inflation of the intrusions 74 is reduced to a state as illustrated in FIG. 4b. Pursuing the exemplary situations, upon the occurrence of a control signal to command full closure of the servo valve 24, the pressure within the space 78 (FIG. 2) drops substantially to ambient with the result that the intrusions 74 are substantially undistorted. As a consequence, the resulting opening 82 (FIG. 4a) is sizable permitting the stream 16 (FIG. 1) to be substantial.

Of course, fluctuations in the control signal from the source 20 (FIG. 1) will be reflected in the extent to which the intrusions are inflated in turn varying the area of the star-shaped opening 82. Accordingly, fine control is afforded over a relatively wide range of flow rates.

It is to be noted that the upper and lower ends of the intrusions 74 are tapered substantially to a point as indicated above by the analogy to a disk sector. Of course, such a shape is significant in that it provides smooth flow surfaces. Other characteristics of the system as disclosed herein may also be significant; however, it is to be appreciated that wide variations therefrom are possible within the scope of the present invention. Accordingly, the scope hereof should be interpreted in accordance with the claims as set forth below.

What is claimed is:

1. A flow valve for controlling flow of a substance in accordance with a control signal comprising:
    means defining a flow passage for said substance;
    a somewhat tubular member of resiliently-deformable material, defining at least three internally-extending radial intrusions for abutting engagement to variously close said tubular member, said tubular member being fixed to receive substance from said flow passage;
    a housing member receiving said somewhat tubular member to provide a somewhat annular operating space about said tubular member, and said tubular member having the characteristic of being non-linearly responsive to a pressure applied to said space for deforming same; and
    fluid control means non-linearly responsive to said control signal for developing a pressure in said operating space that is non-linearly related to said control signal, whereby to linearize the response of said tubular member to control flow in accordance with said control signal.

2. A flow valve according to claim 1 wherein said intrusions are somewhat uniformly tapered to define an arcuate edge and are opposed to mating external indentations.

3. A flow valve according to claim 1 wherein said somewhat tubular member includes equally-spaced intrusions of a number in excess of three.

4. A flow valve according to claim 1 wherein said pressure in said operating space is developed to be logarithmically related to said control signal.

* * * * *